United States Patent Office 3,151,533
Patented Oct. 6, 1964

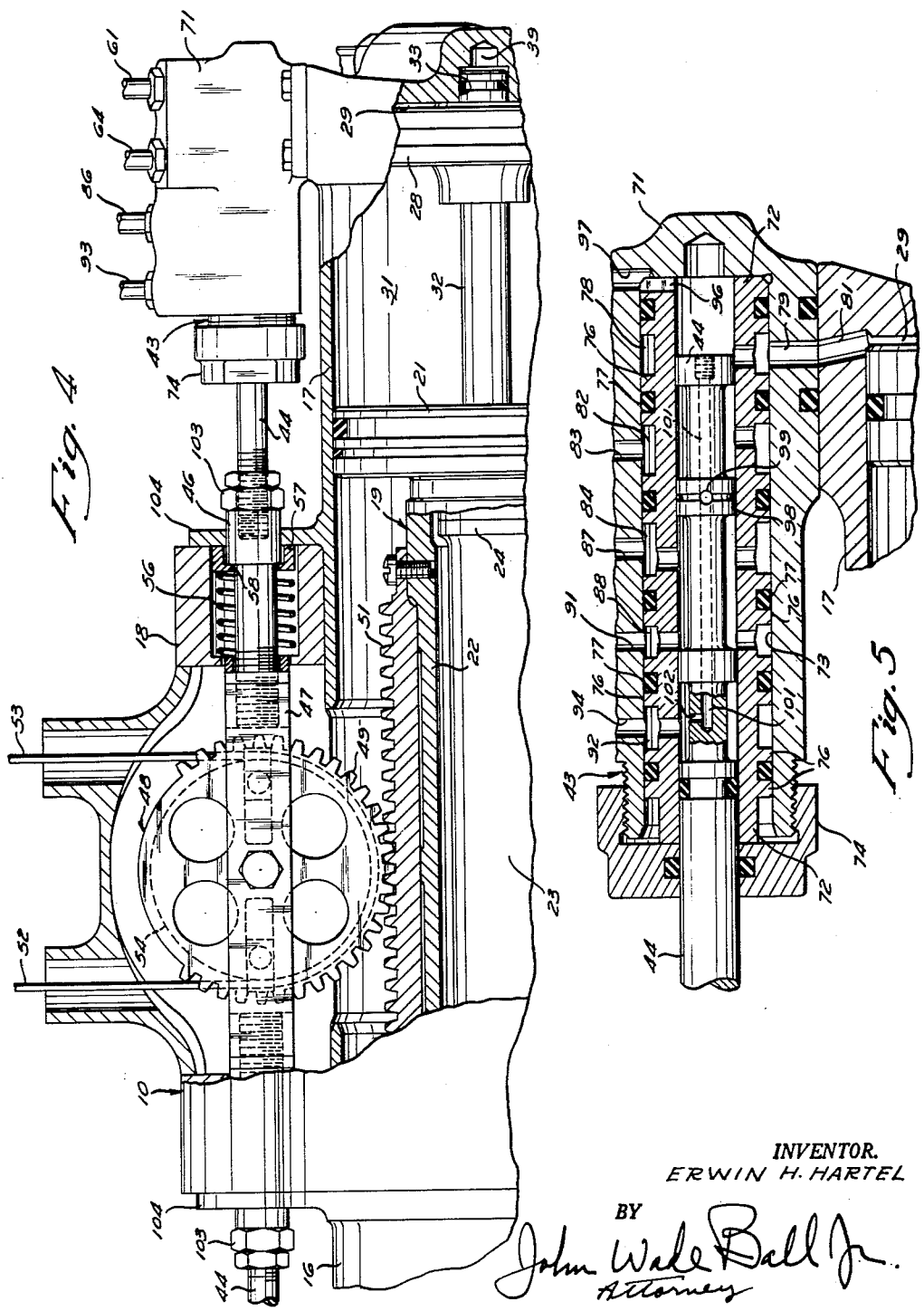

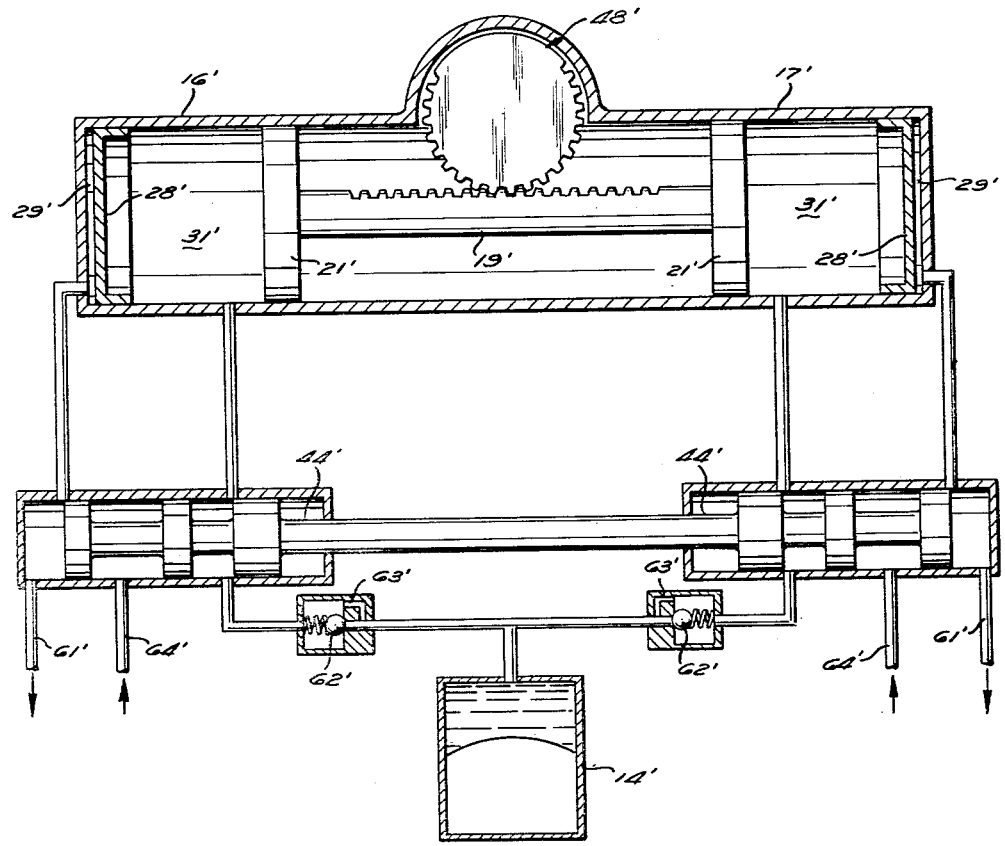

3,151,533
AIRCRAFT STEERING SYSTEM
Erwin H. Hartel, Cleveland, Ohio, assignor to Cleveland Pneumatic Industries, Inc., Cleveland, Ohio, a corporation of Ohio
Filed Aug. 1, 1961, Ser. No. 128,461
14 Claims. (Cl. 91—413)

This invention relates generally to fluid motors and more particularly to a new and improved pneumatically actuated fluid motor suitable for use in accurately positioning and controlling a connected load.

The fluid motor incorporating this invention is illustrated in an aircraft steering installation wherein positive positional control must be combined with shimmy or flutter damping and the efficient utilization of the operating power supplied. It should be understood, however, that a fluid motor system incorporating this invention could be utilized to power other types of connected loads wherein the power source is pneumatic and accurate efficient operation is essential.

In many aircraft the prime source of control and actuation power is pneumatic rather than hydraulic, since a pneumatic system does not require the weight penalty of hydraulic operating fluids. In addition, pneumatic systems can be operated in higher tempeartures and leakage does not produce a fire hazard. Pneumatic systems, however, do produce difficulties when accurate positional control is required, since gas or air is highly compressible and will produce a spongy action and over travel or hunting unless special provisions are provided. In a fluid motor incorporating this invention, pneumatic power is used in an efficient manner, thus, reducing the load requirements on the compressor and hydraulic fluid is used to provide accurate positive control.

It is an important object of this invention to provide a pneumatically opearted fluid motor system incorporating means to insure rapid and precise control of the system.

It is another important obejct of this invention to provide a new and improved pneumatically operated fluid motor system in combination with hydraulic control means which functions to provide accurate positional control.

It is another important object of this invention to provide a new and improved pneumatically powered fluid motor in combination with a hydraulic control mechanism which functions to conserve the amount of compressed air required for the system.

It is another important object of this invention to provide a new and improved pneumatically powered fluid motor system in combination with hydraulic damping and positive positional control.

It is still another object of this invention to provide a new and improved pneumatically operated control system suitable for controlling aircraft components such as aircraft steering systems and the like.

Further objects and adavntages will appear from the following description and drawings wherein:

FIGURE 4 is an enlarged fragmentary side elevation partially in section illustraing the follow up control system;

FIGURE 5 is an enlarged fragmentary section of one control valve; and

FIGURE 6 is a schematic illustration of the system.

Figure 1:
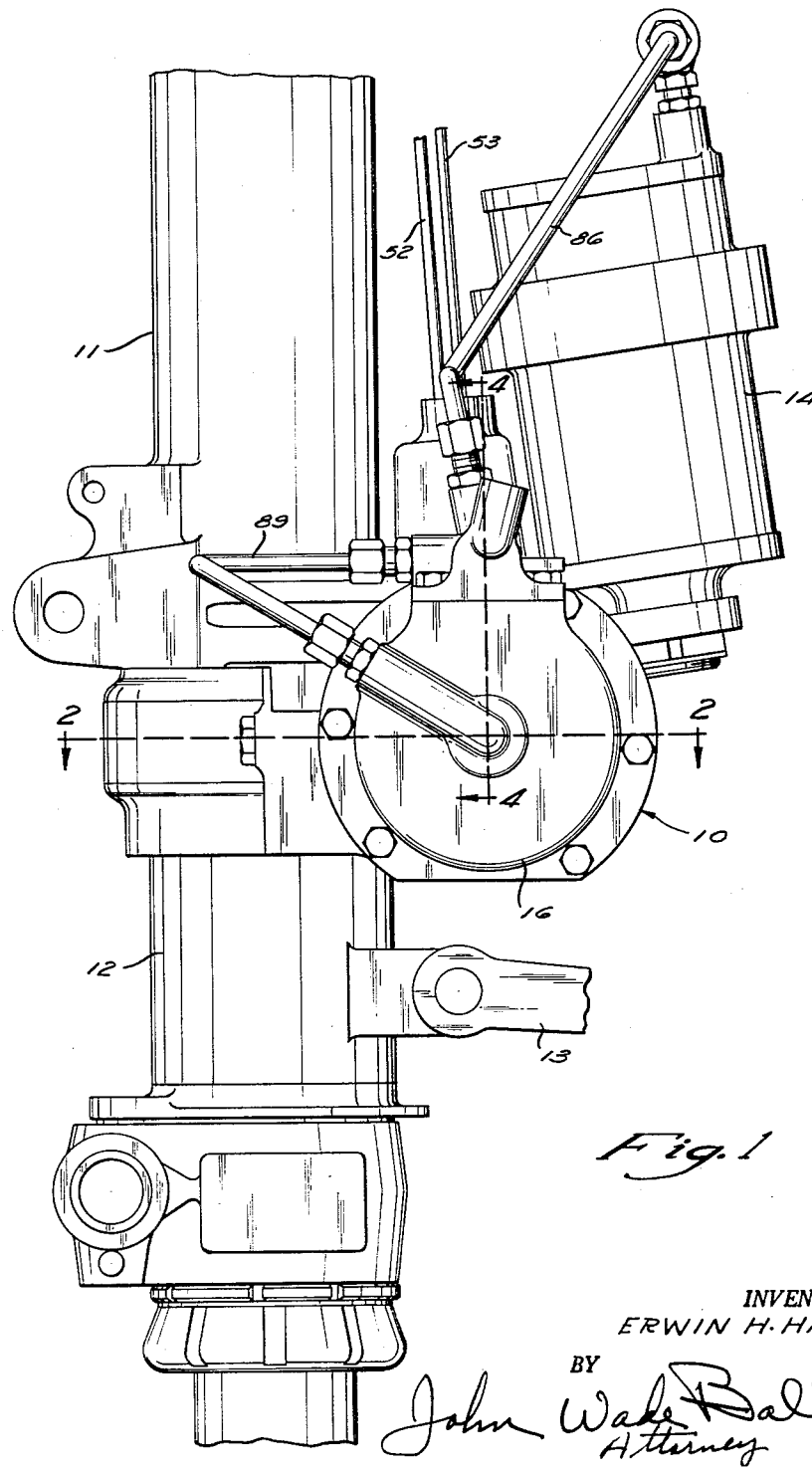
FIGURE 1 is a fragmentary side elevation of a pneumatically operated steering motor incorporating this invention as it would be installed on an aircraft landing gear.

In FIGURE 1 the pneumatically operated steering motor incorporating this invention is shown as it could be mounted on a typical nose landing gear for an aircraft. Since the landing gear per se forms no part of this invention, it has been illustrated only fragmentarily. The steering motor is illustrated at 10 and is mounted on the cylinder 11 of the landing gear. A steering collar 12 is journaled on the cylinder 11 for rotation relative thereto and is connected to be rotated by the steering motor 10 in a manner which will be discussed below in detail. The upper end of the torque arms 13 are connected to the steering collar 12 and the lower end of the torque arms connect to steer the wheels in the usual manner. An accumulator 14 is mounted on the cylinder 11 immediately adjacent to the steering motor 10 to supply a pressurized reservoir for the hydraulic fluid necessary for this system.

Figure 2:
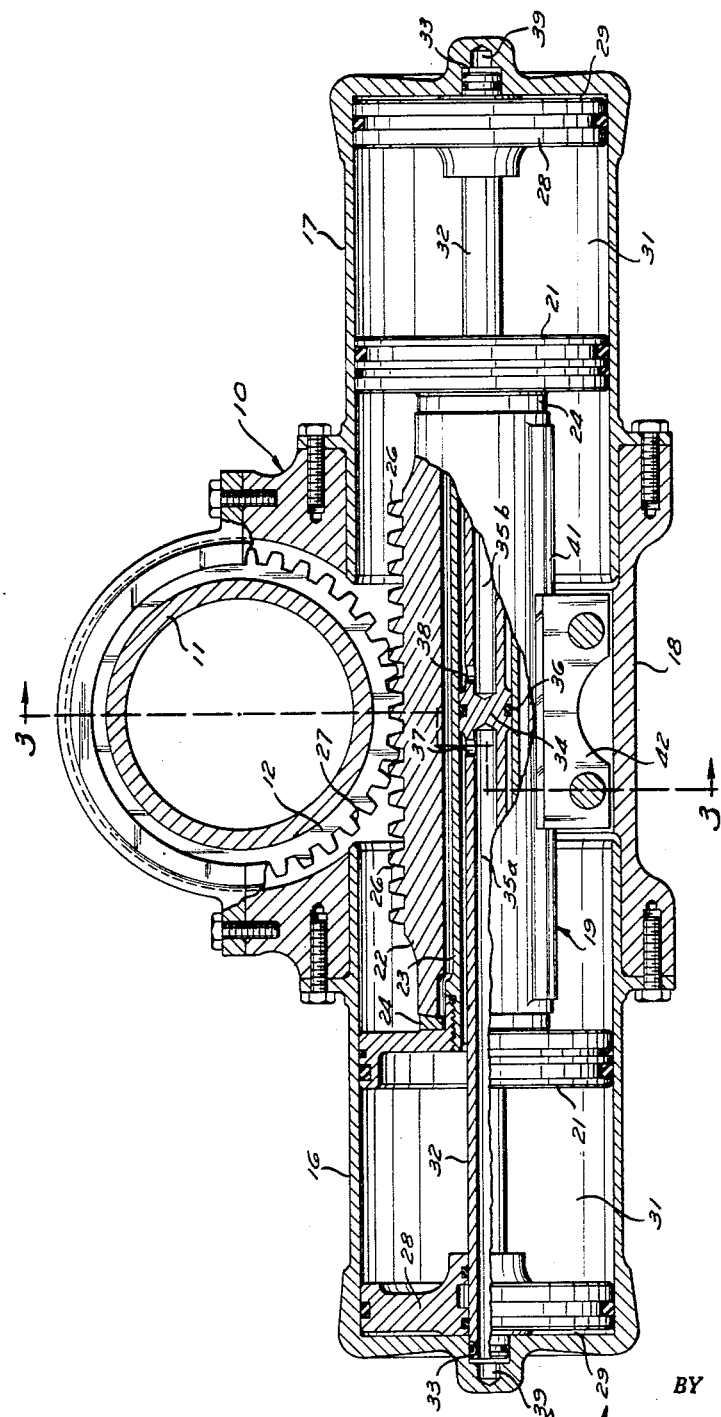
FIGURE 2 is a plan view taken along 2—2 of FIGURE 1 partially in section illustrating the structure of a penumatically operated fluid motor incorporating this invention.

Referring now to FIGURE 2, the steering motor 10 includes opposed cylinders 16 and 17. The two cylinders 16 and 17 project into opposite sides of a central housing 18 mounted on the strut cylinder 11.

A power piston assembly 19 extends between the two cylinders 16 and 17 and is provided with a piston head 21 on each end thereof with one of the piston heads 21 extending into sealing engagement with the cylinder wall of the cylinder 16 and the other into sealing engagement with the cylinder wall of the cylinder 17. A tubular rack member 22 is mounted around a piston tube 23 which supports the piston heads 21. In order to secure the rack member 22 to the power piston assembly, a mounting ring 24 is located at each end of the rack member 22 for engagement with the associated piston head 21. The piston heads 21 are threaded onto the ends of the piston tube 23 to clamp the rack member 22 in the desired position and lock the assembled power piston assembly. The rack member 22 is formed with gear teeth 26 which mesh with teeth 27 on the steering collar 12. Thus, when the power piston assembly 19 moves back and forth in the cylinders 16 and 17, the steering collar 12 is rotated to the desired position.

This rack and pinion drive between the fluid motor and the output element, which in this case is the steering collar, results in a constant torque throughout the entire range of operation and is particularly advantageous in aircraft steering applications since the steering system is then able to provide the necessary steering torque through the entire range of steering.

A floating piston 28 is positioned in each of the cylinders 16 and 17 on the side of the associated piston head 21 remote from the rack. Each floating piston 28 operates to divide the associated cylinder into two fluid chambers. The fluid chamber 29 between the ends of the cylinders and the associated floating piston 28 is adapted to receive compressed air and the chamber 31 between each floating piston and piston head 21 is a liquid filled chamber.

If the elements are in the position shown in FIGURE 2 and the liquid within the liquid chamber 31 of the cylinder 16 is isolated from the remaining hydraulic system and at the same time air under pressure is admitted to the associated chamber 29, the action of the left floating piston 28 causes pressurization of the liquid in the left chamber 31 to a pressure substantially equal to the pressure of the compressed air. This in turn acts upon the left piston head 21 and produces movement of the power piston to the right. Conversely, if air is admitted to the air chamber 29 in the cylinder 17 when the liquid in the associated chamber 31 is isolated from the remainder of the system, the power piston assembly 19 moves to the left. Thus, the fluid motor system is double acting and can produce power to rotate the steering collar in either direction.

Since the two liquid chambers 31 are defined in part by both the floating pistons 28 and the power piston heads 21 and since the operation of the system requires substantial axial displacement of both the floating piston and the power piston assembly, it is necessary to provide passageway means connected to the chambers 31, which will provide the proper fluid connection in all positions of the elements. A hollow supply tube 32 is therefore mounted to extend between the ends of the cylinders 16 and 17 and to fit into a recess 33 in each of the cylinders. The tube 32 is formed with a central bulkhead 34 which divides the passage into a left hand zone 35a and a right hand zone 35b. A seal 36 adjacent the bulkhead 34 engages the internal wall of the piston tube 23. A first radial port 37 connects the left zone 35a with the interior of the piston tube 23 to the left of the seal 36 and a second radial port 38 to the right of the bulkhead 34 connects the right zone 35b with the interior of the piston tube 23 to the right of the seal 36. Clearance is provided between the inner wall of the piston tube 23 and the supply tube 32 so this structure provides a liquid connection between the chamber 31 in the cylinder 16 with a port 39 in the end of the cylinders 16 and a similar liquid connection between the chamber 31 and the cylinder 17 and a port 39 in the end of the cylinder 17. The length of the stroke of the power piston assembly 19 and the length of the piston tube 23 are arranged so that the seal 36 will remain in engagement with the piston tube 23 in all positions of operation. Therefore, liquid connection is provided to each of the liquid chambers 31 in all positions.

Figure 3:
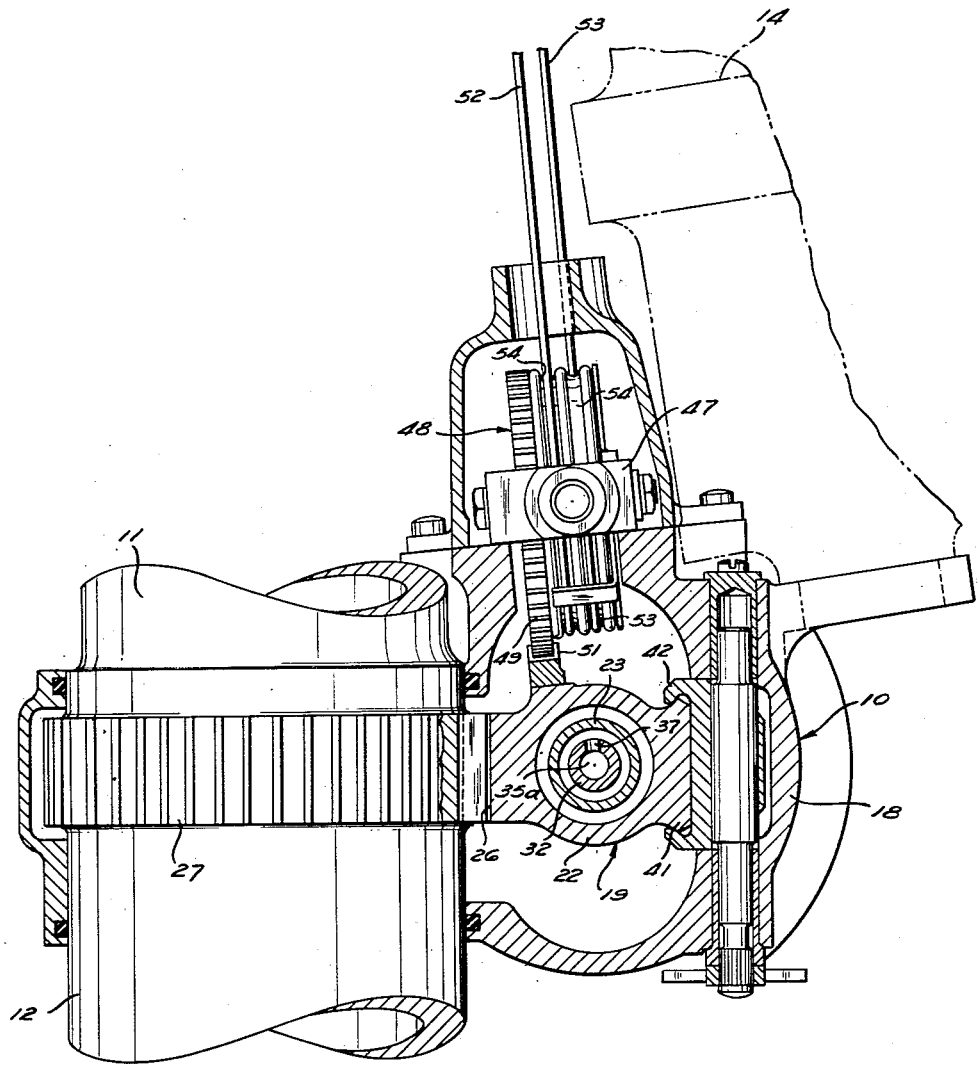
FIGURE 3 is a fragmentary section along 3—3 of FIGURE 2 with parts removed for clarity.

In order to prevent rotation of the power piston assembly, the tubular rack member 22 is formed with a dove tail 41 best illustrated in FIGURE 3, which slides along a bearing guide 42 mounted in the housing 18. This arrangement also provides the bearing necessary to absorb any lateral loads caused by the rack drive and prevent unnecessary piston wear.

In order to control the operation of the fluid motor, a control valve and follow up system is provided, which is best illustrated in FIGURES 3 through 5. Two valve assemblies 43, one for each of the cylinders 16 and 17, are mounted adjacent the ends of the cylinders so that the porting passages connecting the control valve and the chambers within the cylinders have a minimum length to conserve the amount of compressed air used by the system. Since both of the valve assemblies are similar in structure and function, only one will be discussed in detail with the understanding that the discussion applies equally to both valves.

Each of the valve assemblies 43 includes a valve spool 44 connected by an adapter 46 to a valve operating yoke 47. A control pulley and gear assembly 48 is journaled on the yoke 47 and is provided with external gear teeth 49 in mesh with a control gear rack 51 bolted on the tubular rack member 22. Control cables 52 and 53 are anchored in cable grooves 54 on the pulley and gear assembly 48. The two cables 52 and 53 engage the pulley from opposite sides. Therefore if the tension in the cable 52 is greater than the tension in the cable 53 as viewed in FIGURE 4, the pulley and gear assembly 48 will be caused to rotate in a clockwise direction. This causes movement to the right of the valve operating yoke 47 due to the engagement of the teeth 49 and the control rack 51. The valve assemblies 43 are arranged so that such rightward movement of the yoke causes fluid connections to the fluid motor which produce leftward movement of the power piston assembly 19 and consequently return of the yoke 47 to the neutral position. This system automatically provides a feed back so that the fluid motor moves through a distance directly related to the amount of movement of the cables 52 and 53. Centering springs 56 extending between the housing 18 and a collar 57 formed with a shoulder 58 engaging the adapter 46 operate to resiliently urge the valve assemblies and yoke to the neutral position.

Referring now to the schematic illustration of the entire system in FIGURE 6 wherein reference numerals will designate the corresponding elements but a prime (') is added to signify that reference is made to the schematic illustration. When the valve spools 44' are in the neutral position, the two air chambers 29' are connected to the exhaust to atmosphere at 61'. The two oil or liquid chambers 31' are connected to the accumulator 14' through check valves 62' and associated bypass orifices 63'. In this condition the two oil chambers 31' are filled with liquid maintained at the accumulator pressure which is normally in the order of 30 to 100 pounds per square inch.

If flutter or shimmy occurs which tends to rapidly move the power piston assembly 19' back and forth, the action of the oil flowing through the orifices 63' resist the movement and provides hydraulic damping. As an example, if the power piston assembly 19' moves to the left, it reduces the volume of the left chamber 31' displacing liquid through the left orifice 63' around the associated check valve 62'. This movement in turn increases the volume of the right chamber 31' which causes flow through the right hand check valve 62' bypassing the resistance of the associated orifice 63'. The use of two orifices and two check valves assures that a vacuum will not be developed in either of liquid chambers 31'.

The air chambers 29' are connected to exhaust or atmospheric pressure so the pressure within the accumulator transmitted to the two liquid chambers 31' causes the floating pistons 28' to move to the extreme outer ends of their associated cylinders.

If the valve spools 44' are shifted to the left, the left liquid chamber 31' in the cylinder 16' is isolated from the remaining portions of the hydraulic system during the first portion of valve travel. Continued valve spool movement establishes communication between the source of compressed air 64' and the left air chamber 29'. This movement of the valve spools 44', however, does not change the hydraulic connections of the right end of this fluid motor. Since the liquid within the chamber 31' in the cylinder 16' is isolated from the remaining portion of the system, it operates as a hydraulic lock or connection between the left floating piston 28' and the left piston head 21'. Therefore, compressed air entering the air chamber 29' at the left end of the fluid motor operates to pressurize the liquid in the left chamber 31' and as a result, produce a force reaction of the left piston head 21'. This produces rightward movement of the power piston assemblies 19' which continues until the valve spools return to their neutral position. During the rightward movement of the power piston assembly 19', oil is displaced from the right hand liquid chamber 31' through the orifice 63' connected therewith into the accumulator 14'.

When the valve spools 44' return to their neutral position, left hand air chamber 29' is immediately connected to the exhaust. This exhausting of the air pressure prevents overtravel of the power piston assembly 19'. Additional over-travel prevent is provided by the right orifice 63' which resists movement to the right of the power piston assembly 19'. As soon as the pressure in the air chamber 29' at the left end of the fluid motor drops to a value lower than the pressure of the accumulator 14', the liquid flows from the accumulator through the left check valve 62' to the left liquid chamber 31'. This causes the left floating piston 28' to return to its extreme position even though the power piston assembly 19' may be displaced a substantial distance from its initial or neutral position. Movement of the control valve to the neutral position also functions to return the damping function described above.

It should be noted that the pressure supplied from the accumulator 14' always returns the floating piston 28' to its extreme end position, therefore there is substantially zero unswept volume at the beginning of any motor operation. This results in a substantial conservation of the compressed air since it eliminates the necessity of compressing a substantial volume of air already within the air chambers.

If the control valve spools 44' are moved to the right, the opposite connections will be made causing the power piston assembly 19' to move to the left. The action of the feed back system centers the spool valves after the desired amount of piston movement.

Referring again to FIGURES 4 and 5, each control valve 43 includes a housing 71 bolted to the end of the associated cylinder. A valve sleeve 72 is clamped within a bore 73 in a valve housing 71 by a cap 74. The valve sleeve 72 is formed with a series of external lands 76 and O-ring seals 77 which define separate pressure zones. The end zone 78 connects to the air chamber 29 through ports 79 and 81 formed in the housing 71 and cylinder 17 respectively. A supply air pressure zone 82 is adjacent the zone 78 and is connected to the supply air line 64 through a port 83 in the housing 71. The accumulator 14 is connected to the next zone 84 through a pressure line 86 and a radial port 87. The next zone 88 is connected to the supply tube 32 through a port 91 and a pressure line 89 illustrated in FIGURE 1 which connects the valve housing 71 to the port 39 in the end of the cylinder 17. In FIGURE 5 the port 91 has been moved into the plane of the section for purposes of illustration. The last zone 92 between lands 76 is connected to a drain line 93 through a port 94. The valve sleeve 72 is notched at 96 to provide communication between the right end of the spool 44 and a port 97 leading to the exhaust line 61. The two zones 84 and 88 are connected together to connect the accumulator to the liquid chamber 31. If the spool 44 associated with the cylinder 17 is shifted to the right, the spool isolates the zone 88 and in turn, the associated liquid chamber 31 from the accumulator. Continued movement of the spool connects the two zones 78 and 82 so that the air chamber 29 is connected to the supply air pressure. This produces leftward movement of the power piston assembly 19 as described above in connection with the description of the schematic drawing of FIGURE 6.

The valve spool 44 is proportioned so that movement of the valve spool to the left does not change the connections to the various zones. The air chamber 29 in the cylinder 17 remains in communication with exhaust and the liquid chamber 31 remains in communication with the accumulator 14 when the valve moves to the left.

To insure that liquid will not leak into the air system, the land 98 separating the liquid and air sides of the valve is formed with a central annular groove connected through a port 99, on axial passage 101, and a second port 102 to the zone 92 connected to the drain.

Referring to FIGURE 4, the adapter 46 is provided with a lock nut 103 on either side of the yoke 47 which will engage a flange 104 on the associated cylinder 16 or 17 to limit the extent of the displacement of the valve and yoke assembly in either direction. In the event of power failure manual effort applied to the controlled cables 52 and 53 will cause one or the other of the lock nuts 103 to engage the associated shoulder 104 and prevent continued movement of the yoke 47. If this occurs and the steering system is used on an aircraft where the manual effort of the pilot is sufficient to provide non-powered steering, the rotation of the pulley and gear assembly 48 will continue and result in displacement of the power piston assembly 19 to produce manual steering.

A steering system incorporating this invention conserves the compressed air required for steering operations since the floating pistons 28 always move to their end extreme positions when the valves are neutralized regardless of the position of the power piston assembly 19. Since the floating pistons are in the extreme position each time compressed air is supplied to the steering motor, the unswept volume is substantially zero so compressed air is immediately effective in producing steering motor operations.

The fluid motor is not subject to over-travel or hunting since the air chambers are exhausted to atmosphere as soon as the control valve is neutralized. This results in precise steering control even when an elastic fluid such as air is used for the powering of the motor.

By combining the hydraulic control system with the air power, it is possible to provide shimmy damping and positive positional control and the use of the accumulator 14 in combination with the compressed air power provides a self-contained unit insofar as the liquid or hydraulic system is concerned.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A fluid motor comprising a cylinder, a power piston movable in said cylinder cooperating therewith to define a variable volume cavity, a movable separator in said cylinder dividing said cavity into a liquid chamber adjacent said power piston and a gas chamber remote therefrom, a source of liquid at a first pressure, a source of gas at a second pressure higher than said first pressure, and means operative from a first condition wherein said source of liquid is connected to said liquid chamber and said gas chamber is exhausted and a second condition wherein said liquid chamber is isolated from said source of liquid and said gas chamber is connected to said source of gas.

2. A fluid motor comprising a cylinder, a power piston movable in said cylinder cooperating therewith to define a variable volume cavity on each side of said power piston, a movable separator in said cavity dividing each cavity into a liquid chamber adjacent said power piston and a gas chamber remote therefrom, a source of liquid at a first pressure, a source of gas at a second pressure higher than said first pressure, and means operative from a first condition wherein said source of liquid is connected to both liquid chambers and said gas chambers are exhausted and a second condition wherein one liquid chamber is isolated from said source of liquid and the associated gas chamber is connected to said source of gas.

3. A fluid motor comprising a cylinder, a power piston movable in said cylinder cooperating therewith to define a variable volume cavity, a floating piston in said cylinder dividing said cavity into a liquid chamber adjacent said power piston and a gas chamber remote therefrom, a source of liquid at a first pressure, a source of gas at a second pressure higher than said first pressure, an exhaust, and means operative from a first condition to a second condition, said means connecting said source of liquid to said liquid chamber and said gas chamber to said exhaust when in said first condition whereby said floating piston moves to a position of minimum volume of said air chamber, said liquid chamber being isolated from said source of liquid and said gas chamber being connected to said source of gas when said means is in said second condition.

4. A fluid motor comprising a cylinder assembly closed at both ends, a power piston movable in said cylinder formed with spaced piston heads defining working chambers between said piston heads and said cylinder, a hollow piston tube connecting said piston heads, a supply tube mounted at both ends of said cylinder extending through said piston tube with clearance therebetween, a seal on said supply tube engaging the inner wall of said piston tube, porting means in said supply tube communicable with said working chambers disposed on each side of said seal, a bulkhead in said supply tube between said porting means, and a passage in said supply tube communicable with said porting means, a second passage in said supply tube communicable with said porting means with said passages being disposed in non-encompassing relationship whereby fluid communication is provided between each passage and one side of said power piston in all positions of said power piston.

5. A fluid motor comprising a cylinder assembly closed at both ends, a power piston movable between two extreme positions of movement in said cylinder formed with spaced piston heads connected by a hollow piston tube with said piston heads and said cylinder defining working chambers therebetween and with the length of said tube being at least as great as the distance between said extreme positions, a supply tube mounted at both ends of said cylinder extending through said piston tube, said supply tube having an outside diameter less than the inside diameter of said piston tube, a seal on said supply tube engaging the inner wall of said piston tube, porting means in said supply tube on each side of said seal, a bulkhead in said supply tube between porting means, and passage means connected to each end of said supply tube whereby fluid communication is provided between said passage means and one side of said power piston in all positions of said power piston.

6. A fluid motor comprising a cylinder assembly closed at both ends, a power piston movable in said cylinder formed with spaced piston heads connected by a hollow piston tube, a floating piston on each side of said power pistons cooperating with said cylinder and piston heads to define two liquid chambers and cooperating with said cylinder to define an air chamber associated with each liquid chamber, a supply tube mounted at both ends of said cylinder extending through said piston tube and said floating pistons, said supply tube having an outside diameter less than the inside diameter of said piston tube, a seal on said supply tube engaging the inner wall of said piston tube, a port in said supply tube on each side of said seal, a bulkhead in said supply tube between said ports, and a passage connected to each end of said supply tube whereby fluid communication is provided between each passage and one liquid chamber in all positions of said power piston.

7. A fluid motor comprising a cylinder, a power piston movable in said cylinder, a floating piston in said cylinder on each side of said power piston, each floating piston cooperating with said cylinder to define an air chamber the volume of which is changed by movement of said floating piston, each floating piston cooperating with said cylinder and power piston to define a liquid chamber the volume of which is changed by relative movement between said power piston and the associated floating piston, a source of liquid under pressure, a source of air under pressure, an exhaust, and valved means movable between a neutral position and operative positions, said valved means when in said neutral position connecting each liquid chamber to said accumulator and each air chamber to said exhaust, movement of said valved means to either of said operated positions selectively connecting said source of air under pressure to one of said air chambers and simultaneously isolating the associated liquid chamber from said source of liquid.

8. A fluid motor comprising a cylinder, a power piston movable in said cylinder, a floating piston in said cylinder on each side of said power piston, each floating piston cooperating with said cylinder to define an air chamber the volume of which is changed by movement of said floating piston, each floating piston cooperating with said cylinder and power piston to define a liquid chamber the volume of which is changed by relative movement between said power piston and the associated floating piston, an accumulator filled with liquid under pressure, a source of air under pressure, an exhaust, and valved means movable between a neutral position and operative positions, said valved means connecting each liquid chamber to said accumulator and each air chamber to said exhaust when in said neutral position, movement of said valved means to either of said operated positions selectively connecting said source of air under pressure to one of said chambers and simultaneously isolating the associated liquid chamber from said accumulator.

9. A steering motor comprising a cylinder, a power piston movable in said cylinder, a floating piston in said cylinder on each side of said power pistons, each floating piston cooperating with said cylinder to define an air chamber the volume of which is changed by movement of said floating piston, each floating piston cooperating with said cylinder and power piston to define a liquid chamber the volume of which is changed by relative movement between said power piston and the associated floating piston, an accumulator filled with liquid under pressure, a source of air under pressure, an exhaust, and valved means movable between a neutral position and operative positions, said valved means connecting each liquid chamber to said accumulator through a flow restriction and each air chamber to said exhaust when in said neutral position, movement of said valved means to either of said operated positions selectively connecting said source of air under pressure to one of said chambers and simultaneously isolating the associated liquid chamber from said accumulator.

10. A fluid motor comprising a cylinder assembly having opposed cylinders, a power piston head in each cylinder, a piston tube connecting said piston heads maintaining a constant spacing therebetween, a supply tube anchored at its ends in the ends of said cylinders and extending with clearance through said piston tube, a seal on said supply tube sealing with the inner walls of said piston tube, a port in said supply tube on each side of said seal, a bulkhead in said supply tube between said ports, a floating piston in each cylinder between the associated piston head and the end of the cylinder dividing each cylinder into a liquid chamber defined in part by the associated piston head and a gas chamber remote therefrom, a source of liquid under pressure, a source of gas under pressure, an exhaust, and valved means movable between a neutral position and operative positions, said valved means when in said neutral position connecting said source of liquid to both ends of said supply tube thereby connecting both liquid chambers to said source of liquid and connecting each air chamber to said exhaust, movement of said valved means to either of said operated positions selectively connecting said source of air under pressure to one of said air chambers and simultaneously isolating the associated liquid chamber from said source of liquid.

11. A steering system for an aircraft landing wheel comprising a strut, a steering collar journaled on said strut adapted to be connected to steer a landing wheel, a cylinder assembly mounted on said strut having opposed cylinders, a power piston head in each cylinder, a piston tube connecting said piston heads maintaining a constant spacing therebetween, drive means operatively connected to said piston heads and collar rotating said collar in response to movement of said piston heads, a supply tube anchored at its ends in the ends of said cylinders and extending with clearance through said piston tube, a seal on said supply tube sealing with the inner walls of said piston tube, a port in said supply tube on each side of said seal, a bulkhead in said supply tube between said ports, a floating piston in each cylinder between the associated piston head and the end of the cylinder dividing each cylinder into a liquid chamber defined in part by the associated piston head and a gas chamber remote therefrom, a source of liquid at a first pressure, a source of gas at a pressure higher than said first pressure, an exhaust, and valved means movable between a neutral position and operative positions, said valved means when in said neutral position connecting said source of liquid to both ends of said supply tube thereby connecting both liquid chambers to said source of liquid and connecting each air chamber to said exhaust, movement of said valved means to either of said operated positions selectively connecting said source of air under pressure to one of said air chambers and simultaneously isolated the associated liquid chamber from said source of liquid.

12. An aircraft steering motor comprising a cylinder, a pair of spaced power piston heads in said cylinder, a rigid spacer connected to said piston heads, output means connected to said spacer, a floating piston in said cylinder on the side of each piston head remote from said spacer, a liquid chamber between each floating piston and its associated piston head, a gas chamber on the side of each floating piston remote from the associated liquid chamber, valve means, liquid passageways connecting each liquid chamber and said valve means, gas passageways connecting each gas chamber and said valve means, a source of liquid under pressure, a source of gas under pressure, an exhaust, said valve means being operable from a neutral position from which it connects said liquid chambers to said source of liquid and said gas chambers to said exhaust and operated positions in which one of said gas chambers is connected to said source of gas under pressure and the associated liquid chamber is simultaneously isolated from said source of liquid whereby liquid is trapped in the isolated liquid chamber to provide a hydraulic connection between the associated piston head and floating piston.

13. An aircraft steering motor comprising a cylinder, a pair of spaced power piston heads in said cylinder, a rigid spacer connected to said piston heads, output means connected to said spacer, a floating piston in said cylinder on the side of each piston head remote from said spacer, a liquid chamber between each floating piston and its associated piston head, a gas chamber on the side of each floating piston remote from the associated liquid chamber, valve means, liquid passageways connecting each liquid chamber and said valve means, gas passageways connecting each gas chamber and said valve means, an accumulator containing liquid under pressure, a source of gas under higher pressure than said accumulator, an exhaust, said valve means being operable from a neutral position from which it connects said liquid chambers to said accumulator and said gas chambers to said exhaust and operated positions in which one of said gas chambers is selectively connected to said source of gas under pressure and the associated liquid chamber is simultaneously isolated from said accumulator whereby liquid is trapped in the isolated liquid chamber to provide a hydraulic connection between the associated piston head and floating piston.

14. An aircraft steering motor comprising a cylinder, a pair of spaced power piston heads in said cylinder, a rigid spacer connected to said piston heads, output means connected to said spacer, a floating piston in said cylinder on the side of each piston head remote from said spacer, a liquid chamber between each floating piston and its associated piston head, a gas chamber on the side of each floating piston remote from the associated liquid chamber, valve means, liquid passageways connecting each liquid chamber and said valve means, gas passageways connecting each gas chamber and said valve means, an accumulator containing liquid under pressure, a source of gas under pressure, an exhaust, said valve means being operable from a neutral position from which it connects said liquid chambers to said accumulator and said gas chambers to said exhaust, a flow restriction in the passageway from said valve means to said accumulator, said valve means being movable to operated positions in which one of said gas chambers is connected to said source of gas under pressure and the associated liquid chamber is simultaneously isolated from said accumulator whereby liquid is trapped in the isolated liquid chamber to provide a hydraulic connection between the association piston head and floating piston.

References Cited in the file of this patent

UNITED STATES PATENTS

| | | |
|---|---|---|
| 899,795 | Osmer | Sept. 29, 1908 |
| 2,698,605 | Kress | Jan. 4, 1955 |
| 2,808,811 | McLaughlin | Oct. 8, 1957 |
| 2,852,965 | Wallace | Sept. 23, 1958 |